(12) United States Patent
Gupta et al.

(10) Patent No.: US 10,149,140 B2
(45) Date of Patent: Dec. 4, 2018

(54) METHOD AND APPARATUS FOR DISCOVERING NEIGHBORHOOD AWARENESS NETWORKING DEVICES

(71) Applicant: Motorola Mobility LLC, Chicago, IL (US)

(72) Inventors: Ranjeet Gupta, Chicago, IL (US); Mary Hor-Lao, Chicago, IL (US); Binesh Balasingh, Naperville, IL (US); Gabriel Burca, Palatine, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 73 days.

(21) Appl. No.: 15/219,684

(22) Filed: Jul. 26, 2016

(65) Prior Publication Data
US 2018/0035275 A1 Feb. 1, 2018

(51) Int. Cl.
| | |
|---|---|
| *G01R 31/08* | (2006.01) |
| *H04W 8/00* | (2009.01) |
| *H04W 52/02* | (2009.01) |
| *H04W 76/28* | (2018.01) |
| *H04W 84/12* | (2009.01) |

(52) U.S. Cl.
CPC ....... *H04W 8/005* (2013.01); *H04W 52/0225* (2013.01); *H04W 76/28* (2018.02); *H04W 84/12* (2013.01)

(58) Field of Classification Search
CPC . H04W 8/005; H04W 52/0229; H04W 84/12; H04W 84/18; H04W 48/12
See application file for complete search history.

(56) References Cited

U.S. PATENT DOCUMENTS

| | | | |
|---|---|---|---|
| 7,864,744 B2 | 1/2011 | Song et al. | |
| 9,049,578 B2 | 6/2015 | Abraham et al. | |
| 9,125,124 B2 | 9/2015 | Dwivedi et al. | |
| 9,398,437 B2 | 7/2016 | Kasslin et al. | |
| 9,439,147 B2 * | 9/2016 | Huang | H04W 52/0229 |
| 9,480,013 B2 | 10/2016 | Fang et al. | |
| 9,554,344 B2 * | 1/2017 | Huang | H04W 48/12 |
| 9,578,626 B2 | 2/2017 | Sadasivam et al. | |
| 9,693,217 B2 | 6/2017 | Kasslin et al. | |
| 9,763,190 B2 | 9/2017 | Abraham et al. | |
| 9,801,039 B2 * | 10/2017 | Oren | H04W 8/005 |
| 9,820,117 B1 | 11/2017 | Tran et al. | |
| 2017/0019853 A1 | 1/2017 | Ghosh et al. | |
| 2017/0347359 A1 | 11/2017 | Yang et al. | |
| 2018/0027366 A1 | 1/2018 | Fujimori et al. | |

* cited by examiner

*Primary Examiner* — Hanh N Nguyen

(57) ABSTRACT

A method and apparatus includes a NAN communication device suppressing NAN scanning and scanning using an alternate scanning protocol while suppressing NAN scanning. The method additionally includes detecting a transmission from another communication device while scanning using the alternate scanning protocol and determining the detected transmission is a NAN transmission. The method further includes discontinuing suppressing NAN scanning in response to detecting the NAN transmission.

16 Claims, 5 Drawing Sheets

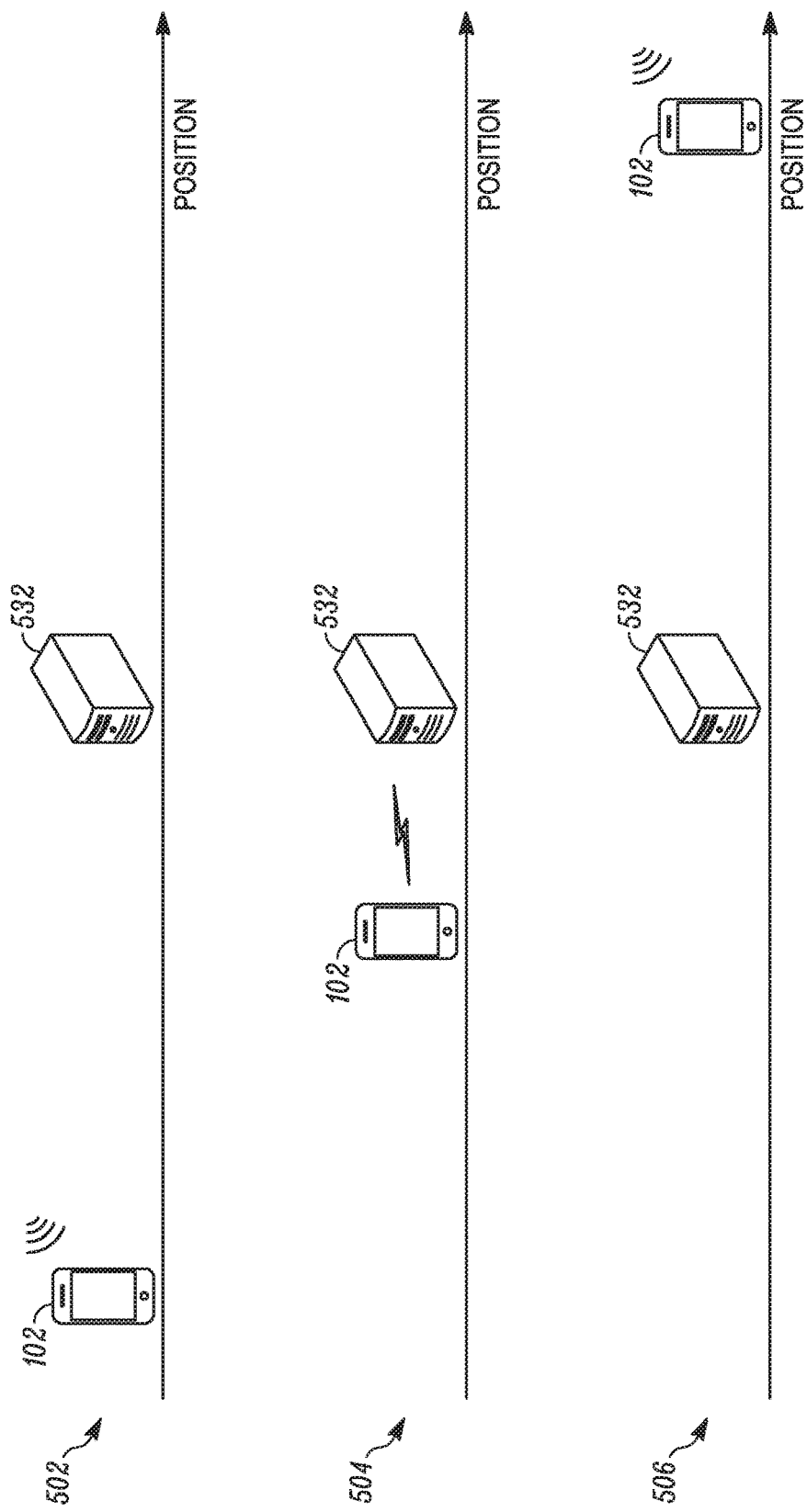

METHOD AND APPARATUS FOR DISCOVERING NEIGHBORHOOD AWARENESS NETWORKING DEVICES

FIELD OF THE DISCLOSURE

The present disclosure relates generally to wireless communication and more specifically to discovering neighborhood awareness networking communication devices using an alternate scanning protocol to neighborhood awareness networking scanning.

BACKGROUND

The popularity of proximity-based social and mobile services has grown significantly over the last few years, and the expectation is that it will continue to do so for the foreseeable future as the mobile ecosystem evolves. To meet demand for such services, neighborhood awareness networking (NAN) technology, such as Wi-Fi Aware™, was developed. A NAN protocol allows for the bidirectional sharing of information directly between nearby or proximate NAN devices without the need for an intermediary device such as a base station, access point, router, or other infrastructure device and without the need for a network connection. Accordingly, a NAN protocol is a proximity-based protocol that provides for transmissions and scanning procedures which facilitate NAN devices discovering other NAN devices within range or proximity, wherein a discovered NAN device, for instance, offers information or a service meeting a specified criteria.

One shortcoming relates to the current mechanism for locating or discovering other NAN devices within range. To do this, for instance using Wi-Fi Aware™, NAN devices continuously transmit NAN discovery beacon frames while also scanning for the NAN discovery beacon frames of other NAN devices. However, the transmission of and scanning for NAN discovery beacon frames comes at a power cost. In some cases, measurements and estimates show and predict that transmitting and scanning for NAN discovery beacon frames can account for approximately 50% of a mobile device's average power consumption over the course of a day.

BRIEF DESCRIPTION OF THE FIGURES

The accompanying figures, where like reference numbers refer to identical or functionally similar elements throughout the separate views, form part of the specification and illustrate embodiments in accordance with the included claims.

FIG. 5 shows a schematic diagram of a NAN communication device using an alternate scanning protocol to scan for NAN transmissions while passing within range of another NAN communication device, in accordance with some embodiments.

Figure 1:
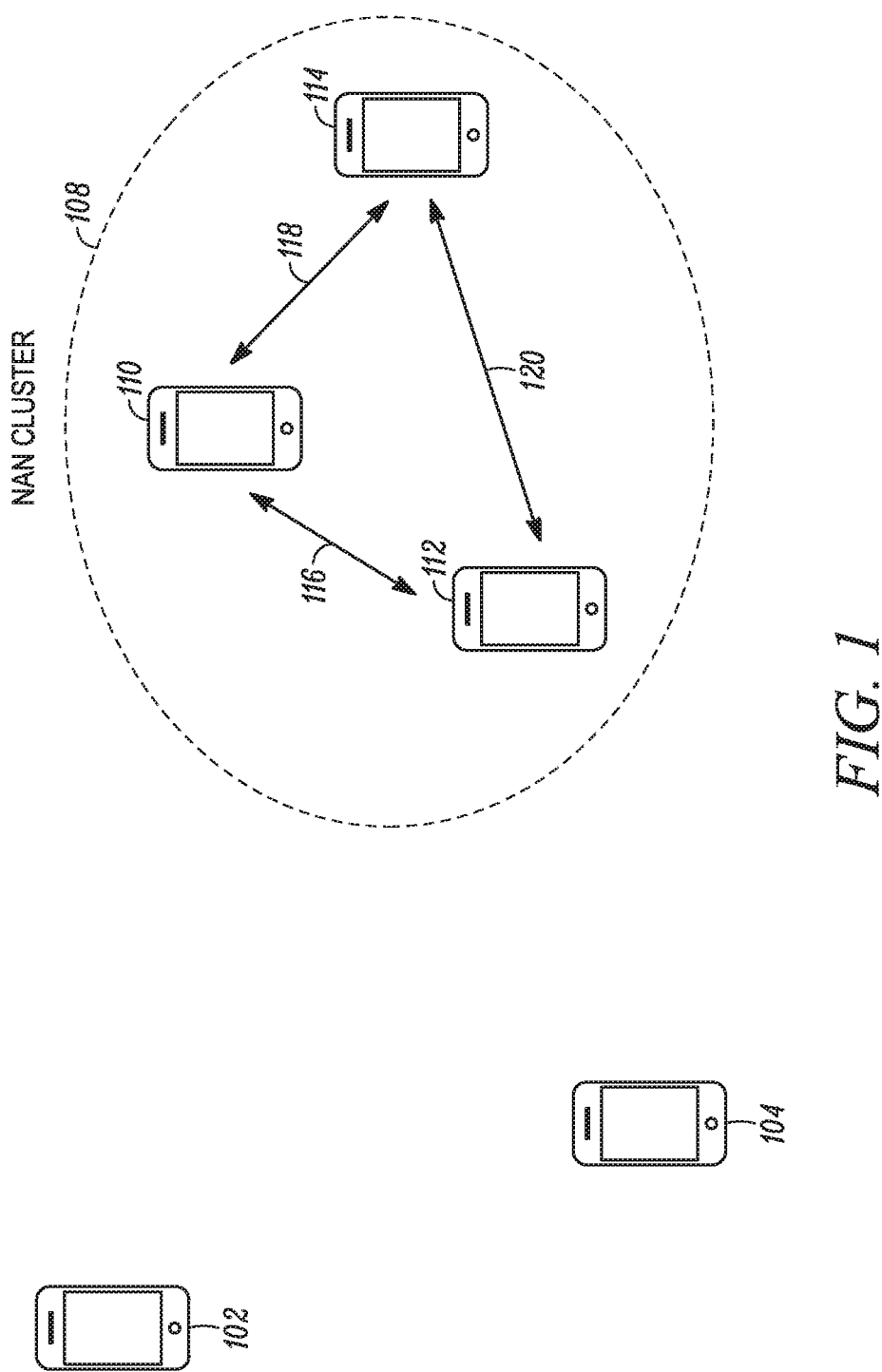
FIG. 1 shows a NAN communication device scanning for other NAN communication devices, three of which are pictured operating in a NAN cluster, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for the discovery of NAN communication devices. More specifically, a NAN communication device uses an alternate scanning protocol, while suppressing NAN scanning, to detect a NAN transmission from another NAN communication device. In accordance with described embodiments, suppressing NAN scanning until a NAN transmission is detected using an alternate scanning protocol provides the benefit of power savings over continuously executing unsuppressed NAN scanning while NAN transmissions are not being detected.

In accordance with the teachings herein, a method performed by a communication device includes suppressing NAN scanning and scanning using an alternate scanning protocol while suppressing NAN scanning. The method additionally includes detecting a transmission from another communication device while scanning using the alternate scanning protocol and determining the detected transmission is a NAN transmission. The method further includes discontinuing suppressing NAN scanning in response to detecting the NAN transmission.

Also in accordance with the teachings herein is a communication device having a first scanning module to scan using a NAN scanning protocol and a second scanning module to scan using an alternate scanning protocol. The communication device additionally includes a processing element coupled to the first and second scanning modules. The processing element is used to suppress scanning using the first scanning module, scan using the second scanning module while suppressing scanning using the first scanning module, detect a NAN transmission while scanning using the second scanning module, and discontinue suppression of scanning using the first module in response to detecting the NAN transmission.

NAN communication devices, also referred to simply as communication devices or NAN devices, are electronic devices configured to operate in accordance with a NAN protocol, such as Wi-Fi Aware™, by sending and scanning for NAN transmissions, such as NAN discovery beacon frames, NAN synchronization beacon frames, and NAN service discovery frames, in order to discover other NAN devices. NAN discovery beacon frames are also referred to simply as discovery beacon frames. A non-exhaustive list of electronic devices which can operate as NAN devices includes smartphones, phablets, tablets, laptops, e-book readers, portable media players, portable gaming devices, athletic monitoring devices, GPS navigation devices, desktop computers, and servers.

FIG. 1 shows a NAN device 102 scanning for other NAN devices. Also shown are three NAN devices 110, 112, 114 operating in a NAN cluster 108 and an isolated NAN device 104 not belonging to a NAN cluster. The NAN devices 102, 104, 110, 112, and 114 are configured to implement a NAN protocol by which these devices transmit NAN discovery beacon frames and scan for NAN discovery beacon frames transmitted by other NAN devices to facilitate the discovery of NAN devices and NAN clusters. For a particular embodiment, the NAN devices 102, 104, 110, 112, and 114 are configured in accordance with the "Neighbor Awareness Networking Technical Specification," Version 1.0, hereinafter "NANTSv1.0," issued by the Wi-Fi Alliance with regard to its Wi-Fi Aware™ program to transmit and scan for NAN discovery beacon frames, which are modified IEEE 802.11 beacon management frames. A more detailed description of a NAN device transmitting NAN discovery beacon frames and scanning for NAN discovery beacon frames is provided with reference to FIG. 4.

Figure 4:
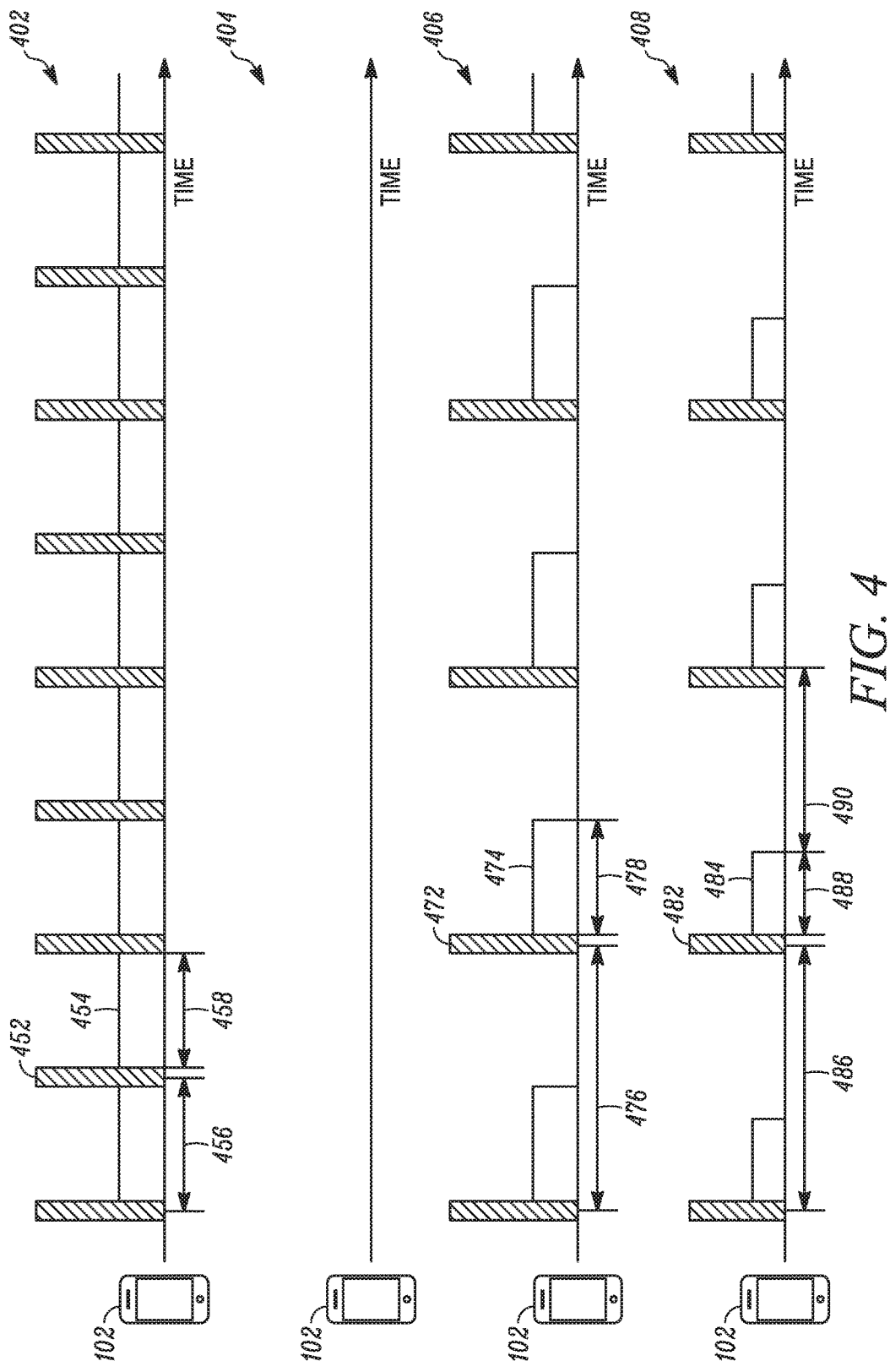
FIG. 4 shows a schematic diagram of a NAN communication device performing NAN scanning and suppressing NAN scanning, in accordance with some embodiments.

Turning momentarily to FIG. 4, a first 402 of four pictured presentations 402, 404, 406, 408 shows the NAN device 102 transmitting NAN discovery beacon frames 452 and performing NAN scanning 454 between the transmissions of the NAN discovery beacon frames 452. As used herein, a time interval between consecutive NAN discovery beacon frames transmitted by the same NAN device is referred to as an "interframe time interval." An interframe time interval for the NAN discovery beacon frames 452 is indicated in presentation 402 at 456. The NANTSv1.0 specifies a time between consecutive NAN discovery beacon frames transmitted by the same NAN device of between 50 time units (TUs) and 200 TUs. However, for some embodiments, the interframe time interval is longer than 200 TUs.

For some embodiments, a TU is an arbitrary unit of time that indicates a relative relationship between times specified herein and/or with times indicated in TUs appearing within the NANTSv1.0 and other technical specifications directed to NAN operations. In other embodiments, a TU represents 1024 microseconds, in accordance with one or more of the Institute of Electrical and Electronics Engineers (IEEE) 802.11 standards. For a particular embodiment, a TU is equivalent to a millisecond.

Indicated at 458 is a scanning time interval for the NAN device 102. A scanning time interval is the length of time a NAN device scans for NAN discovery beacon frames of other NAN devices between transmissions of its own NAN discovery beacon frames. In presentation 402, for example, the NAN device 102 continuously scans for NAN discovery beacon frames of other NAN devices from the termination of its own NAN discovery beacon frame 452 to the beginning of its next NAN discovery beacon frame.

The NAN discovery beacon frames 452 make the NAN device 102 discoverable to the NAN device 104, provided that the NAN device 104 is scanning for the NAN discovery beacon frames 452 and is within range to receive them. Similarly, the NAN device 102, while it is scanning 454, discovers the NAN device 104 when it receives NAN discovery beacon frames from the NAN device 104.

Carried with NAN discovery beacon frames are NAN information elements (IEs). NAN attributes are incorporated in the NAN IEs, which, for some embodiments, adhere to a vendor-specific implementation. Each NAN device can both generate NAN IEs for transmission and decode received NAN IEs. A NAN IE carried by the NAN discovery beacon frame received from the NAN device 104 communicates to the NAN device 102 a service and/or information being sought or offered by the NAN device 104. If the service and/or information being sought or offered by the NAN device 104 is being offered or sought, respectively, by the NAN device 102, then the NAN devices 104 and 102 form a direct connection with each other using a protocol sufficient to provide the service and/or information. The direct connection, using, for example, Wi-Fi direct or some other peer data connection, occurs without the need for local area network (LAN) or wide area network (WAN) infrastructure.

Individual NAN devices which have discovered one another can also group into a NAN cluster. A NAN cluster is a collection of NAN devices that share a common set of NAN parameters and are synchronized to the same discovery window schedule, for instance as specified in the NANTSv1.0. The NAN devices 110, 112, 114 of the NAN cluster 108 send and receive NAN transmissions between themselves, as indicated at 116, 118, and 120. Using the transmissions, the NAN devices 110, 112, 114 participate in a NAN master device selection procedure, which is based on a relative ranking of parameters between the NAN devices 110, 112, 114. The NAN device elected as master, taken to be the NAN device 110, controls the timing of cluster 108 operations. The subordinate NAN devices 112 and 114 synchronize with the master NAN device 110 to determine the discovery window schedule and the timing of NAN synchronization beacon frames.

All of the NAN devices 110, 112, 114 operating in the NAN cluster 108 transmit and receive NAN service discovery frames to communicate available services and information. Only the master NAN device 110, however, transmits NAN discovery beacon frames. The subordinate NAN devices 112, 114 discontinue transmitting NAN discovery beacon frames until such time as they assume the role of the master device or are no longer participating in the NAN cluster 108. The NAN cluster 108 is discoverable to the NAN device 102 by NAN discovery beacon frames being transmitted by the master NAN device 110.

Figure 2:
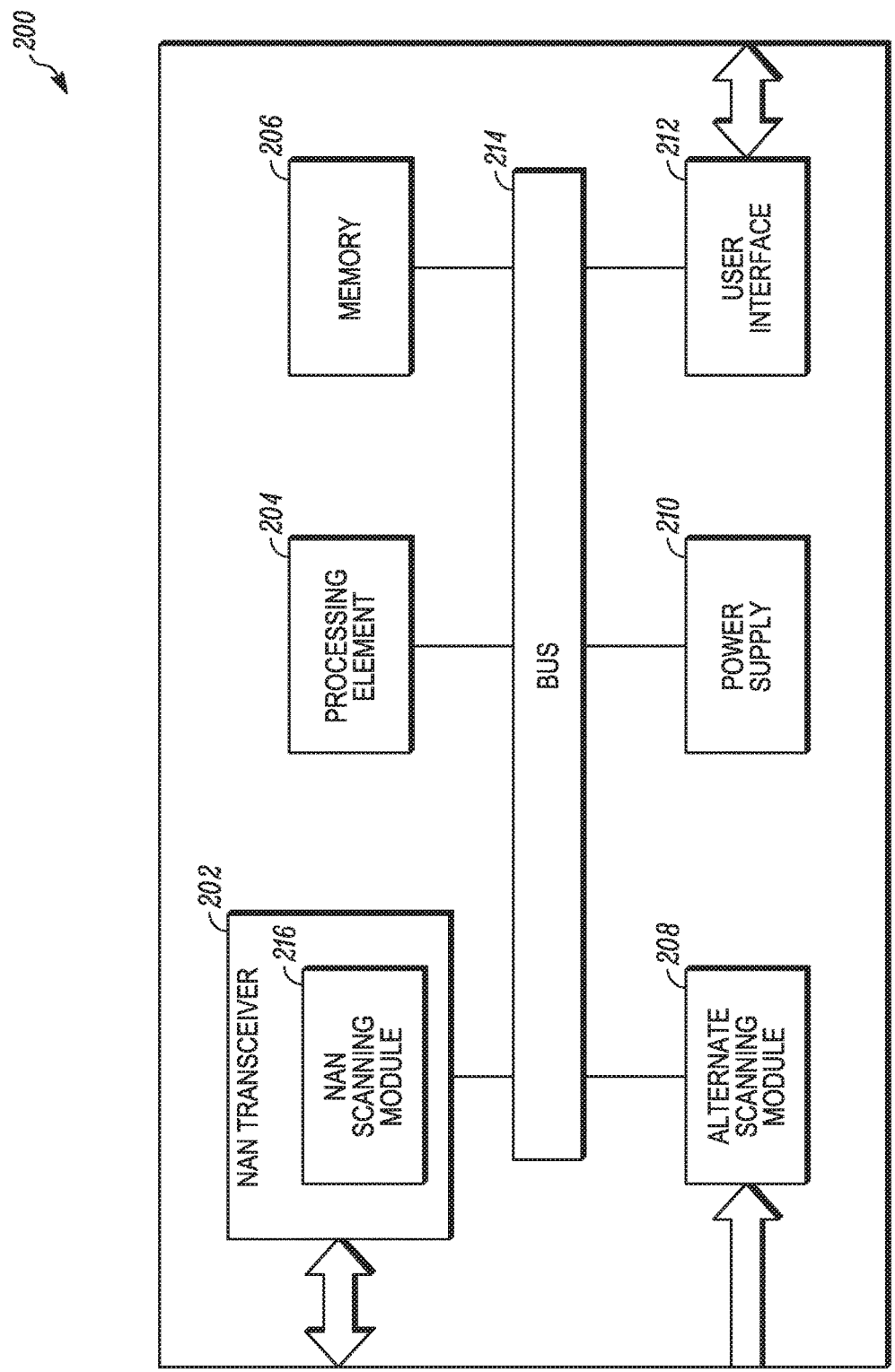
FIG. 2 shows a block diagram of a NAN communication device with internal components, in accordance with some embodiments.

FIG. 2 shows a block diagram of a NAN device 200 in accordance with embodiments of the present teachings. For a particular embodiment, the NAN device 200 represents the NAN device 102. Included within the NAN device 200 is: a NAN transceiver 202, which includes a NAN scanning module 216; a processing element 204; memory 206; an alternate scanning module 208; a power supply 210, and a user interface 212, which are all operationally interconnected by internal connections such as a bus 214.

A limited number of device components 202, 204, 206, 208, 210, 212, 214, 216 are shown within the NAN device 200 for ease of illustration. Other embodiments may include a lesser or greater number of components in a NAN device. Moreover, other components needed for a commercial embodiment of a NAN device that incorporates the components 202, 204, 206, 208, 210, 212, 214, 216 shown for the NAN device 200 are omitted from FIG. 2 for clarity in describing the enclosed embodiments.

In general, one or more of the device components 202, 204, 206, 208, 210, 212, 214, 216 are configured with functionality in accordance with embodiments of the present disclosure as described herein with respect to the remaining figures. "Configured," "adapted," "operative," or "capable," as used herein, means that indicated components are implemented using one or more hardware elements, which may or may not be programmed with software and/or firmware, as the means for the indicated components to implement their desired functionality. For an example, at least one of the components 202, 204, 206, 208, 210, 212, 214, 216 can be configured through executing algorithms consistent with the diagrams shown in FIGS. 3, 4, and 5 and the accompanying description.

The processing element 204, for instance, includes arithmetic logic and control circuitry necessary to perform the digital processing, in whole or in part, for the NAN device 200 to discover other NAN devices in accordance with described embodiments for the present teachings. For one embodiment, the processing element 204 represents a primary microprocessor, also referred to as a central processing unit (CPU), of the NAN device 200. For example, the processing element 204 can represent an application processor of a tablet. In another embodiment, the processing element 204 is an ancillary processor, separate from the CPU, wherein the ancillary processor is dedicated to providing the processing capability, in whole or in part, needed for the components 202, 206, 208, 210, 212, 214, 216 of the NAN device 200 to perform at least some of their intended functionality.

The memory 206 provides storage of electronic data used by the processing element 204 in performing its functionality. For example, the processing element 204 can use the memory 206 to load applications, save settings, and/or store files associated with the discovery of and communication with other NAN devices. In one embodiment, the memory 206 represents random access memory (RAM). In other embodiments, the memory 206 represents volatile or nonvolatile memory. For a particular embodiment, a portion of the memory 206 is removable. For example, the processing element 204 can use RAM to cache data while it uses a micro secure digital (microSD) card to store files associated with functionality performed in conjunction with discovering NAN devices.

The NAN transceiver 202 includes components which allow it to both send and receive NAN transmissions, such as NAN transmissions identified in the NANTSv1.0. In some embodiments, these transmissions are sent and received on Wi-Fi channel 6 (2.437 GHz) in the 2.4 GHz frequency band. In other embodiments, the transmissions are sent and received on Wi-Fi channel 44 (5.220 GHz) and/or channel 149 (5.745 GHz) in the 5 GHz frequency band. For described embodiments, NAN transmissions include NAN discovery beacon frames. In some embodiments, NAN transmissions further include NAN service discovery frames, such as publish and/or subscribe messages. In particular, the NAN scanning module 216 of the NAN transceiver 202 is configured to receive the NAN discovery beacon frames, and for some embodiments, additionally receive NAN service discovery frames.

The alternate scanning module 208 includes a receiver configured to receive wireless transmissions that are not NAN transmissions. For some embodiments, the alternate scanning module 208 is included in a Wi-Fi transceiver module used in the NAN device 102 for general Wi-Fi transmission and reception, such as for the discovery of, and/or communication with, a Wi-Fi station or access point.

The user interface 212 represents a set of one or more components that allow for communication between the NAN device 200 and a user, owner, and/or programmer of the NAN device 200. In some embodiments, the user interface 212 includes an input component, such a keypad, which allows an individual to enter data into the NAN device 200. A user, for example, might use the input component 212 to provide an application executing on the NAN device 200 with criteria by which particular services in which the user is interested may be identified. In other embodiments, the user interface 212 includes an output component, such a display or speaker, which allows an individual to receive information from the NAN device 200. The NAN device 200 might present notifications of available services for which the user has indicated interest. For additional embodiments, the user interface 212 includes both an input component and an output component, which allow for a bi-directional flow of information between the user and the NAN device 200. The NAN device 200, for example, might include a touchscreen configured for displaying images and text and also for receiving tactile input.

The power supply 210 represents a power source that supplies electric power to the device components 202, 204, 206, 208, 212, 214, 216, as needed, during the course of their normal operation. The power is supplied to meet the individual voltage and load requirements of the device components 202, 204, 206, 208, 212, 214, 216 that draw electric current. For some embodiments, the power supply 210 is a wired power supply that provides direct current from alternating current using a full- or half-wave rectifier. For other embodiments, the power supply 210 is a battery that powers up and runs a portable NAN device. For a particular embodiment, the battery 210 is a rechargeable power source. A rechargeable power source for a NAN device is configured to be temporarily connected to another power source external to the NAN device to restore a charge of the rechargeable power source when it is depleted or less than fully charged. In another embodiment, the battery 210 is simply replaced when it no longer holds sufficient charge.

Figure 3:
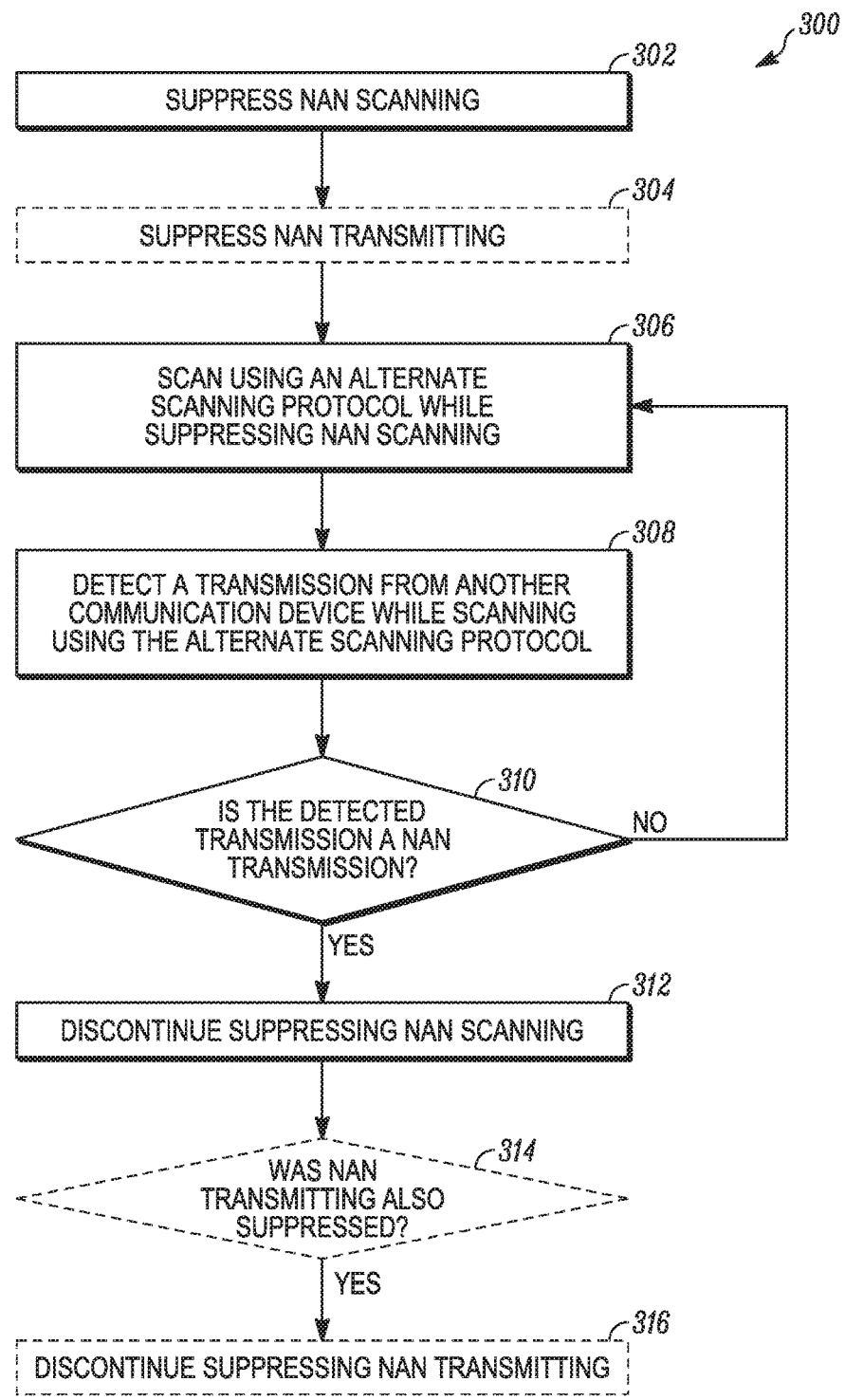
FIG. 3 shows a logical flow diagram illustrating a method for suppressing NAN scanning while using an alternate scanning protocol to scan for NAN transmissions, in accordance with some embodiments.

A detailed description of the functionality of the NAN device 102 shown in FIG. 1 using the components shown FIG. 2 is provided with reference to the remaining figures. FIG. 3, for example, shows a logical flow diagram illustrating a method 300 performed by a NAN device, taken to be the NAN device 102, for suppressing NAN scanning while using an alternate scanning protocol to scan for NAN transmissions. Suppressing NAN scanning, indicated in block 302, means that scanning for NAN transmissions by the NAN scanning module 216 is curtailed either partially or completely in comparison to when NAN scanning is not suppressed. For some embodiments, NAN transmitting is also suppressed, as indicated in block 304. Turning again to FIG. 4, suppressing NAN scanning and NAN transmitting is described in further detail.

The first presentation 402 shown in FIG. 4, described previously, graphically represents unsuppressed NAN scanning by the NAN device 102. For embodiments in accordance with the NANTSv1.0, the interframe time intervals 456 between the NAN discovery beacon frames 452 are between 50 to 200 TUs, and the scanning time intervals 458 refer to continuous NAN scanning blocks 454 between the NAN discovery beacon frames 452. By contrast to the first presentation 402, the second 404, third 406, and fourth 408 presentations of FIG. 4 illustrate suppressed NAN scanning.

For some embodiments, suppressing NAN scanning includes disabling NAN scanning. This is illustrated in presentation 404, which shows NAN scanning is discontinued in that it is no longer performed by the NAN scanning module 216. Also absent from presentation 404 are any NAN discovery beacon frames transmitted by the NAN transceiver 202. This reflects an embodiment which further includes disabling transmitting NAN discovery beacon frames while suppressing NAN scanning. In other instances, the NAN device 102 disables transmitting NAN service discovery frames while suppressing NAN scanning. For some embodiments, NAN transmitting is disabled altogether while NAN scanning is suppressed.

For other embodiments, suppressing NAN scanning includes reducing NAN scanning as compared to unsuppressed NAN scanning. In such embodiments, NAN scanning is not completely curtailed. Presentation 406 illustrates ways in which the NAN device 102 can partially suppress NAN scanning and NAN transmitting. As compared to presentation 402, for which no suppression occurs, every other NAN discovery beacon frame is omitted from presentation 406, along with the scanning block that immediately followed the omitted NAN discovery beacon frames. For scanning blocks 474 and NAN discovery beacon frames 472 that remain in presentation 406, the scanning time intervals 478 are of the same length as the scanning time intervals 458, but the interframe time intervals 476 have doubled as compared to the interframe time intervals 456 for presentation 402.

In other embodiments, NAN scanning and NAN transmitting is suppressed by omitting different combinations of NAN discovery beacon frames and associated scanning blocks from the unsuppressed sequence in different patterns. Labeling the sequence of presentation 402, without omissions, as successive positive integers "1-2-3-4-5," and the sequence of every other NAN discovery beacon frame 472 and scanning block 474, illustrated in presentation 406, as the sequence of successive odd integers "1-3-5-7-9," for example, other embodiments of suppressed scanning and transmitting are represented by sequences "1-4-7-10-13," "1-2-4-5-7," and "1-4-5-8-9." Other embodiments represent additional sequences associated with suppressing NAN scanning and NAN transmitting.

For some embodiments, reducing NAN scanning includes NAN scanning during scanning time intervals which are discontinuous in time. Viewing the suppressed NAN scanning and NAN transmitting illustrated in presentation 406 differently, the spacing of the NAN discovery beacon frames 452 and NAN scanning blocks 454 of the unsuppressed presentation 402 is increased to yield the suppressed presentation 406. This increases the interframe time interval from that indicated at 456 to that indicated at 476. The scanning time interval 478 for scanning block 474, however, is the same as the scanning time interval 458 for scanning block 454. This results in suppressed NAN scanning that is discontinuous. The scanning blocks 474 are separated from one another by approximately the difference in time between the interframe time interval 476 and the scanning time interval 478.

Continuous NAN scanning occurs without interruption, notwithstanding the duration of NAN discovery beacon frame transmissions, or other NAN transmissions, for which NAN scanning may briefly cease. In presentation 402, for example, NAN scanning is continuous, occurring at every time a NAN discovery beacon frame, or other NAN frame, is not being transmitted. Discontinuous NAN scanning occurs if there are periods of time when a NAN device both is not sending a NAN transmission and not performing NAN scanning. NAN scanning is discontinuous in presentation 408, for example. During the initial portion of time interval 490, the NAN device 102 is not performing NAN scanning or sending a NAN transmission. A scanning time interval 488, for instance, is a discontinuous scanning time interval, whereas the scanning time interval 458 is a continuous scanning time interval.

In presentation 408, discovery beacon frames 482 are distributed with an interframe time interval 486, which is similar to the interframe time interval 476 for presentation 406. In presentation 408, however, the transmission of the NAN discovery beacon frames 482 is further suppressed in that the NAN device 102 transmits them at a reduced power level as compared to the transmission of the NAN discovery beacon frames 472 or 452. Scanning is also further suppressed in that scanning blocks 484 have the scanning time interval 488, which is shorter than the scanning time intervals 478 and 458 for scanning blocks 474 and 454, respectively.

For various embodiments, NAN scanning and NAN transmitting is reduced, and thereby suppressed or further suppressed, by increasing interframe time intervals. NAN scanning is also reduced, and thereby suppressed or further suppressed, by decreasing scanning time intervals. Additionally, NAN transmitting is also reduced, and thereby suppressed or further suppressed, by decreasing a transmission power level. An added benefit of increasing interframe time intervals and transmitting at a reduced power level is lowering transmission congestion when multiple NAN devices are transmitting on a common channel.

In one embodiment, one or more of the discontinuous scanning time intervals when NAN scanning is suppressed is shorter in time than an interframe time interval between NAN discovery beacon frames when NAN scanning is not suppressed. This is made evident by comparing presentation 408 to presentation 402. In presentation 408, the scanning time interval 488 is shorter than the interframe time interval 456 of presentation 402.

In another embodiment, one or more of the discontinuous scanning time intervals when NAN scanning is suppressed is shorter than one or more continuous scanning time intervals when NAN scanning is not suppressed. This is also made evident by comparing presentation 408 to presentation 402. In presentation 408, the scanning time interval 488 is shorter than the scanning time interval 458 of presentation 402.

In further embodiments, the discontinuous scanning time intervals are shorter than an interval of time separating the discontinuous scanning time intervals. This is illustrated in presentation 408 where the scanning time intervals 488 are shorter than an interval of time 490 separating the scanning blocks 484. For a particular embodiment, the discontinuous scanning time intervals 488 are 50 TUs or less in length, below the minimum length of time specified in the NANTSv1.0. In an embodiment having discontinuous scanning time intervals of different lengths, one or more of the discontinuous scanning time intervals is 50 TUs or less in length.

For some embodiments, reducing NAN scanning includes disabling passive NAN scanning while decreasing active NAN scanning. Active NAN scanning is reactionary scanning that occurs in anticipation of an expected response to a transmitted message. In accordance with the NANTSv1.0, for example, a NAN device may use NAN service discovery frames to actively look for availability of specific services. NAN service discovery protocol messages include publish and subscribe messages. A NAN device sends a subscribe message to solicit another NAN device to responsively transmit a publish message if response criteria are met. The NAN device 102 scanning for a response to a transmitted subscribe message exemplifies decreased active NAN scanning if the active NAN scanning occurs less frequently or on a shorter intervals of time as compared to when active NAN scanning is not being suppressed.

For other embodiments, reducing NAN scanning includes disabling active NAN scanning while decreasing passive NAN scanning. Passive NAN scanning is scanning that occurs without an expected response to a previously transmitted message. Scanning for NAN discovery beacon frames, for example, is passive NAN scanning because the NAN discovery beacon frames are not received in response to a message soliciting their transmission. Reduced NAN scanning consistent with these embodiments is illustrated by the scanning blocks 474 and 484 of presentations 406 and 408, respectively, provided that active NAN scanning is discontinued.

Returning to FIG. 3, the method 300 continues with the NAN device 102 scanning 306 using an alternate scanning protocol while suppressing NAN scanning. Scanning using an alternate scanning protocol, for an embodiment, means that the alternate scanning module is performing scanning separately from the NAN scanning module while NAN scanning by the NAN scanning module is being suppressed. For example, the alternate scanning module 208 is included in a Wi-Fi transceiver which scans for Wi-Fi transmissions while the NAN scanning module 216 of the NAN transceiver 202 discontinues scanning.

While scanning using the alternate scanning protocol, the NAN device 102 detects 308 a transmission from another communication device. The NAN device 102 then determines 310, using, for example, the processing element 204, if the detected transmission is a NAN transmission. For various embodiments, the NAN device 102 determining the detected transmission is a NAN transmission includes determining that the detected transmission has an information element identifying the detected transmission as a NAN transmission.

In some embodiments, the information element includes an organization unit identifier (OUI) which uniquely identifies a vendor, manufacturer, or other organization associated with the detected transmission. The OUI, in turn, includes an indication which identifies the detected transmission as a NAN transmission, for instance, a hexadecimal value used in a particular field or data location of the OUI. For one embodiment, the information element is a NAN IE, incorporating NAN attributes, which is carried with NAN discovery beacon frames. When the NAN device 102 receives a NAN discovery beacon frame as a detected transmission, the NAN device 102 determines from a hexadecimal value in an OUI-Type field that the detected transmission is a NAN discovery beacon frame.

For some embodiments, the NAN device 102 determining the detected transmission is a NAN transmission includes determining that the detected transmission is part of a set of reoccurring transmissions having a periodicity of between 50 and 200 TUs. The detected transmission, for instance, is a NAN discovery beacon frame which is part of a set of periodically reoccurring NAN discovery beacon frames being transmitted by the NAN device 104 in a pattern analogous to that illustrated in presentation 402 of FIG. 4.

In accordance with the NANTSv1.0, NAN discovery beacon frames have a transmission periodicity of between 50 and 200 TUs. This is the time of transmission reoccurrence, or the interframe time interval, which is the same as the reception periodicity or the time between the reception of successive NAN discovery beacon frames. If the NAN device 102 measures a periodicity of less than 50 TUs or greater than 200 TUs, then the NAN device 102 determines the detected transmission is not a NAN discovery beacon frame. If, on the other hand, the NAN device 102 measures a periodicity of between 50 and 200 TUs, then the NAN device 102 determines the detected transmission is a NAN transmission. In a particular embodiment, the NAN device 102 further decodes the OUI of the NAN transmission to verify the detected transmission is a NAN transmission.

When the NAN device 102 determines 310 that the detected transmission is not a NAN transmission, the NAN device 102 continues to scan 306 for transmissions using the alternate scanning protocol while NAN scanning is being suppressed. If, however, the NAN device 102 determines 310 the detected transmission is a NAN transmission, then the NAN device 102 discontinues 312 suppressing NAN scanning. If NAN transmitting was also suppressed, as indicated at 304 and determined at 314, then the NAN device 102 also discontinues 316 suppressing NAN transmitting upon determining that the detected transmission is a NAN transmission.

Discontinuing suppressing NAN scanning means restoring NAN scanning to the NAN scanning module 216. If NAN scanning was discontinued by the NAN scanning module 216 in suppressing NAN scanning, then the NAN scanning module 216 again continues to perform NAN scanning. For example, NAN scanning is restored from occurring as illustrated in presentation 404 back to occurring as illustrated in presentation 402. If NAN scanning by the NAN scanning module 216 was reduced in suppressing NAN scanning, then NAN scanning by the NAN scanning module 216 is again increased. For example, NAN scanning is restored from occurring as illustrated in presentation 406 or 408 back to occurring as illustrated in presentation 402.

Discontinuing suppressing NAN transmitting means restoring NAN transmitting to the NAN transceiver 202. If NAN transmitting was discontinued by the NAN transceiver 202 in suppressing NAN transmitting, then the NAN transceiver 202 again continues to perform NAN transmitting. For example, NAN transmitting is restored from occurring as illustrated in presentation 404 back to occurring as illustrated in presentation 402. If NAN transmitting by the NAN transceiver 202 was reduced in suppressing NAN transmitting, then NAN transmitting by the NAN transceiver 202 is again increased. For example, NAN transmitting is restored from occurring as illustrated in presentation 406 or 408 back to occurring as illustrated in presentation 402.

FIG. 5 illustrates a use case of scanning for NAN transmissions using an alternate scanning protocol while suppressing NAN scanning. In particular, FIG. 5 shows three successive "snapshots" 502, 504, 506 in time as a user carries his smartphone, taken to be the NAN device 102, while walking along State Street in downtown Chicago. The user is interested in furnishing a new apartment and specifies, using a NAN control panel or NAN application executing on his smartphone 102, that he wishes to receive NAN retail notices directed to special offers on sofas and dinning sets.

As the smartphone 102 is carried down the street in snapshot 502, the NAN transceiver 202 is powered down or in a standby mode while the smartphone 102 suppresses 302 NAN scanning and suppresses 304 NAN transmitting. This conserves the remaining battery 210 charge for the smartphone 102. The smartphone 102 scans 306 for radio transmissions using an alternate scanning protocol. For an embodiment, the alternate scanning protocol is an 802.11 station scanning protocol. This is the protocol the smartphone 102 uses to monitor for Wi-Fi stations and access points when Wi-Fi operation is enabled on the smartphone 102. In this case, the alternate scanning module 208 is part of a Wi-Fi transceiver which operates in accordance with the IEEE LAN/MAN Standards Committee (IEEE 802). This includes some or all of the Wi-Fi standards, for example, 802.11 a, 802.11g, 802.11 n, and 802.11 ac, being used in isolation or combination. In other embodiment, this includes standards being developed but not yet finalized, such as the IEEE 802.11ai standard.

As the smartphone 102 is carried further down the street in snapshot 504, it passes by a shop which maintains a NAN device 532 to alert potential patrons of exclusive deals and featured merchandise. The shop's NAN device 532 transmits discovery beacon frames, which the smartphone 102 is now within range to detect 308. Using its processing element 204, the smartphone 102 determines 310 from an OUI included with a transmission the smartphone 102 receives that the received transmission is a NAN transmission. In response to determining that the received transmission is a NAN transmission, the smartphone 102 discontinues 312 suppressing NAN scanning and discontinues 316 suppressing NAN transmitting by powering up its NAN transceiver 202.

The powered-up NAN transceiver 202 now detects NAN discovery beacon frames the shop's NAN device 532 continues to transmit. From NAN IEs included within the NAN discovery beacon frames, the smartphone 102 determines the shop's NAN device 532 is providing information on discounted furniture. As this meets the criteria set by the user, the smartphone 102 establishes a Wi-Fi direct connection, or other peer data connection, with the shop's NAN device 532 to receive the shop's special offer and present it to the user using the user interface 212.

As the smartphone 102 is carried a great enough distance past the shop in snapshot 506, the smartphone 102 is no longer within range of the shop's NAN device 532. Alternatively, the smartphone 102 has finished exchanging information with the shop's NAN device 532. If no other NAN transmissions are being received from another NAN device, the smartphone 102 again suppresses 302 NAN scanning and suppresses 304 NAN transmitting by powering down the NAN transceiver 202 to conserve battery charge until such time as the Wi-Fi transceiver with its Wi-Fi scanning module 208 and processing element 204 again detect 308, 310 a NAN transmission.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a first communication device, the method comprising:
    suppressing neighborhood awareness networking scanning while the first communication device is not included in a cluster by reducing neighborhood awareness networking scanning as compared to unsuppressed neighborhood awareness networking scanning, wherein the reducing of neighborhood awareness networking scanning includes performing neighborhood awareness networking scanning during scanning time intervals that are discontinuous in time, and wherein the discontinuous scanning time intervals are shorter than an interval of time separating the discontinuous scanning time intervals;
    scanning using an alternate scanning protocol while suppressing neighborhood awareness networking scanning;
    detecting a transmission from a second communication device while scanning using the alternate scanning protocol;
    determining the detected transmission is a neighborhood awareness networking transmission; and
    discontinuing suppressing neighborhood awareness networking scanning in response to detecting the neighborhood awareness networking transmission.

2. The method of claim 1, wherein the alternate scanning protocol comprises an 802.11 station scanning protocol.

3. The method of claim 1, wherein the suppressing of neighborhood awareness networking scanning further comprises disabling neighborhood awareness networking scanning.

4. The method of claim 1 further comprising disabling neighborhood awareness networking transmitting while suppressing neighborhood awareness networking scanning.

5. The method of claim 1 further comprising disabling transmitting discovery beacon frames while suppressing neighborhood awareness networking scanning.

6. The method of claim 1 further comprising disabling transmitting service discovery frames while suppressing neighborhood awareness networking scanning.

7. The method of claim 1, wherein the reducing of neighborhood awareness networking scanning further comprises disabling passive neighborhood awareness networking scanning while decreasing active neighborhood awareness networking scanning.

8. The method of claim 1, wherein the reducing of neighborhood awareness networking scanning further comprises disabling active neighborhood awareness networking scanning while decreasing passive neighborhood awareness networking scanning.

9. The method of claim 1, wherein one or more of the discontinuous scanning time intervals when neighborhood awareness networking scanning is suppressed is shorter in time than an interframe time interval between discovery beacon frames when neighborhood awareness networking scanning is not suppressed.

10. The method of claim 1, wherein one or more of the discontinuous scanning time intervals is 50 time units or less.

11. The method of claim 1, wherein determining the detected transmission is a neighborhood awareness networking transmission comprises determining that the detected transmission is part of a set of reoccurring transmissions having a periodicity of between 50 and 200 time units.

12. The method of claim 1, wherein determining the detected transmission is a neighborhood awareness networking transmission comprises determining that the detected transmission comprises an information element that identifies the detected transmission as a neighborhood awareness networking transmission.

13. A communication device comprising:
    a first scanner to facilitate scanning using a neighborhood awareness networking scanning protocol;
    a second scanner to facilitate scanning using an alternate scanning protocol; and
    a processing element to:
        suppress scanning using the first scanner while the communication device is not included in a cluster by reducing neighborhood awareness networking scanning as compared to unsuppressed neighborhood awareness networking scanning, wherein the reducing of neighborhood awareness networking scanning includes performing neighborhood awareness networking scanning during scanning time intervals that are discontinuous in time, and wherein the discontinuous scanning time intervals are shorter than an interval of time separating the discontinuous scanning time intervals;
        scan using the second scanner while suppressing scanning using the first scanner;
        detect a neighborhood awareness networking transmission while scanning using the second scanner; and
        discontinue suppression of scanning using the first scanner in response to detecting the neighborhood awareness networking transmission.

14. The communication device of claim 13, wherein the alternate scanning protocol comprises an 802.11 station scanning protocol.

15. A communication device comprising:
    a first scanner to facilitate scanning using a neighborhood awareness networking scanning protocol;
    a second scanner to facilitate scanning using an alternate scanning protocol; and
    a processing element to:
        suppress scanning using the first scanner while the communication device is not included in a cluster by reducing neighborhood awareness networking scanning as compared to unsuppressed neighborhood awareness networking scanning, wherein the reducing of neighborhood awareness networking scanning includes performing neighborhood awareness networking scanning during scanning time intervals that are discontinuous in time, and wherein one or more of the discontinuous scanning time intervals when neighborhood awareness networking scanning is suppressed is shorter than one or more continuous scanning time intervals when neighborhood awareness networking scanning is not suppressed;
        scan using the second scanner while suppressing scanning using the first scanner;
        detect a neighborhood awareness networking transmission while scanning using the second scanner; and
        discontinue suppression of scanning using the first scanner in response to detecting the neighborhood awareness networking transmission.

16. The communication device of claim 15, wherein the alternate scanning protocol comprises an 802.11 station scanning protocol.

* * * * *